United States Patent [19]
Chitayat

[11] Patent Number: 5,519,266
[45] Date of Patent: May 21, 1996

[54] HIGH EFFICIENCY LINEAR MOTOR

[75] Inventor: Anwar Chitayat, Northport, N.Y.

[73] Assignee: Anorad Corporation, Hauppauge, N.Y.

[21] Appl. No.: 44,264

[22] Filed: Jun. 1, 1993

[51] Int. Cl.[6] .............................. H02K 1/12; H02K 3/46
[52] U.S. Cl. .......................... 310/12; 310/179; 310/180; 318/135
[58] Field of Search .......................... 310/12, 179, 180, 310/154; 318/135

[56] References Cited

U.S. PATENT DOCUMENTS

| | | | |
|---|---|---|---|
| 1,488,873 | 4/1924 | Francis | 310/180 |
| 1,566,939 | 12/1925 | Welch | 310/180 |
| 3,207,935 | 9/1965 | Masovsky et al. | 310/172 |
| 4,340,833 | 7/1982 | Sudo et al. | 310/268 |
| 4,633,108 | 12/1986 | von der Heide | 310/12 |
| 4,638,192 | 1/1987 | von der Heide | 310/12 |
| 4,766,358 | 8/1988 | Higuchi | 318/135 |
| 4,912,746 | 3/1990 | Oishi | 310/12 |
| 5,087,844 | 2/1992 | Takedomi et al. | 310/12 |
| 5,298,819 | 3/1994 | Suganuma et al. | 310/12 |
| 5,343,105 | 8/1994 | Sakabe et al. | 310/179 |

FOREIGN PATENT DOCUMENTS

| | | | |
|---|---|---|---|
| 2403675 | 5/1979 | France | 310/154 |
| 3-270670 | 12/1991 | Japan | 310/12 |

Primary Examiner—Thomas M. Dougherty
Attorney, Agent, or Firm—Christopher R. Pastel; Thomas R. Morrison

[57] ABSTRACT

A linear motor has coil assemblies driven by multiple phases mounted side by side on a base plate such that they do not overlap. The coil assemblies include conductors wound upon teeth such that voids in the coil assemblies are minimized along with path lengths and thermal resistances between windings and the base plate, thus maximizing heat dissipation and the power capacity of the motor. The linear motor may have coil assemblies with teeth composed of a first material having desirable magnetic properties and a base plate composed of an inexpensive second material minimizing costs of materials. The teeth may be of varying lengths in or to further minimize voids. The coil assemblies are compactly mounted with a longitudinal axis normal to an axis of movement. Permanent magnets are mounted upon a back iron plate with axis of symmetry normal to the axis of movement. The magnets have outline shapes such that a generally sinusoidal magnetic flux distribution is produced along said axis of movement so as to prevent cogging.

18 Claims, 6 Drawing Sheets

HIGH EFFICIENCY LINEAR MOTOR

BACKGROUND OF THE INVENTION

The present invention relates to linear motors and, more particularly, to high power linear motors having a design yielding high efficiency by means of a compact coil structure.

Linear motors are used in systems for positioning and moving items, including machining and gantry type systems. The systems often require that items having large masses be subjected to high accelerations. This, in turn, requires that the linear motors exert large continuous forces upon the items to be moved. A large amount of heat is produced by resistive losses in the coil windings during the process of generating such forces. This heat must be dissipated in order to prevent damage to the motors. Forced air or water cooling is often employed to remove the heat. The capacity of the cooling method used limits the power dissipation capacity of the motor.

One of the factors which determines the capacity of the cooling method is the thermal conductance of the coil assembly. This thermal conductance is maximized when the thermal path leading away from turns of the coil is composed of uninterrupted high thermal conductance material. Conventional linear motors utilize coils composed of turns of round cross section wire which inevitably leave insulating air spaces between layers of turns which in turn reduces the thermal conductance of the coil; ultimately restricting the operating power of the motor.

The present conventional design of linear motors employs overlapping coils wound on teeth of a laminated steel core. The force generated by a linear motor is proportional to the area occupied by the steel core. Typically, a force of three to four pounds is generated per square inch of motor area. Therefore, an application requiring 1,000 pounds of force requires 250 to 330 square inches of area, and such a machine would have typical dimensions of 7" by 36" to 48". The large area occupied by such a machine presents a problem in applications having either size or weight restrictions.

Additionally, conventional linear motors generally employ a three-phase driving system. In such a system, individual coils are each driven by one of the phases while overlapping neighboring coils driven by the other two phases. Thus, depending on a degree of overlap involved, the centers of the flux distributions, of three coils driven by the three phases, may be located within a length equaling the width of a single coil. This overlapping requires that the windings overlap each other outside of a toothed portion of the core. This overlapping results in a bulky arrangement of the coils outside of the core and a further increase in the space requirement of the linear motor.

The material employed in the construction of the core of such machines is generally selected from core materials, such as steel alloys, having a high magnetic saturation level and a high magnetic permeability in order to permit the production of the high magnetic flux densities required for the production of large forces by the linear motor. Such core materials are expensive. Therefore, the required size dictates that the costs of the materials significantly contribute to the cost of the linear motor.

In the conventional linear motor, permanent magnets attached to a back iron plate above the coils of the armature are generally rectangular in shape. These magnets are mounted next to each other, each successive magnet having a pole orientation opposite that of the prior magnet. The magnets are aligned so that they are inclined a slight angle from a normal to an axis of movement of the linear motor. This inclined angle creates a flux distribution along the axis of movement which is generally sinusoidal in nature. Such a distribution reduces a cogging effect in the operation of the linear motor which would otherwise occur if the magnets were aligned normal to the axis of movement.

Although the inclined angle of the magnets reduces cogging, it presents a disadvantage in that a larger area must be covered by the rectangular magnets in order to sufficiently cover and interact with the coils of the armature. Portions of the rectangular magnets must protrude out past the ends of the coils so that coverage is achieved. This results in wasted magnet material, increased size, weight and cost.

Furthermore, since each magnet is mounted next to the adjacent magnet with little space therebetween, holes through which the back iron may be mounted must be located outside the area of the magnets. Protruding ears with holes therein are used to mount the back iron. Such a method increases the footprint size of the back iron and its weight. Both increases present problems in applications were there are size constraints and low mass is desirable. If the back iron plate is mounted on the movable portion of the linear motor, the increased mass reduces the acceleration achieved by the motor and the ability of the motor to stop thereby requiring an increase in the dissipation of power.

OBJECTS AND SUMMARY OF THE INVENTION

Accordingly, it is an object of the invention to provide a linear motor which overcomes the drawbacks of the prior art.

It is a further object of the invention to provide a linear motor having an increased power handling capability due to improved heat dissipation characteristics of coil assemblies therein.

It is a still further object of the invention to provide a linear motor having a reduced size and mass effectuated by compact construction techniques and alternative means of shaping magnetic flux distributions.

An object of the invention is to provide a linear motor of increased power handling capability having a reduced materials cost due to selective use of expensive materials in coil assemblies.

Briefly stated, there is provided a linear motor which has coil assemblies driven by multiple phases mounted side by side on a back plate such that they do not overlap. The coil assemblies include conductors wound upon teeth such that spaces in the coil assemblies are minimized along with path lengths and thermal resistance between windings and the back plate, thus maximizing heat dissipation and the power capacity of the motor. The linear motor may have coil assemblies with teeth composed of a first material having desirable magnetic properties and a back plate composed of a inexpensive second material minimizing the cost of materials. The coil assemblies are compactly mounted with a longitudinal axis normal to an axis of movement. Permanent magnets are mounted upon a back iron with axis of symmetry normal to the axis of movement. The magnets have outline shapes such that a generally sinusoidal magnetic flux distribution is produced along said axis of movement so as to prevent cogging.

In accordance with these and other objects of the invention, there is provided a linear motor having an armature comprising: a plurality of coil assemblies, a base plate, and the coil assemblies being next to each other upon the base plate in a non-overlapping and non-interleaving arrangement.

According to a feature of the invention, there is further provided a method of manufacturing an armature for a linear motor comprising: clamping a center tooth member in a fixture, winding a conductor under tension upon the center tooth member to create a coil, affixing side tooth members to sides of said center tooth member parallel to said center tooth member, repeating the above steps of winding, upon an assembly resulting from the prior step of affixing side tooth members, and affixing, to create another coil until a desired number of coils have been completed forming a coil assembly, repeating each of the above steps until a required number of coil assemblies have been built, and affixing said coil assemblies to a base plate.

According to an embodiment of the invention, there is provided a linear motor comprising: coil assemblies aligned normal to an axis of movement, permanent magnets, a back iron plate, said permanent magnets being mounted to said back iron plate adjacent to one another with pole orientations normal to said back iron plate, said pole orientations alternating along said axis of movement and remaining uniform along axis normal to said axis of movement, said permanent magnets having an outline shape such that a generally sinusoidal magnetic flux distribution is created along the axis of movement reducing cogging effects, said permanent magnets having spaces therebetween, said permanent magnets being mounted so that centerlines of field distributions, of said permanent magnets mounted along a common axis normal to said axis of movement, are normal to said axis of movement.

An embodiment of the present invention includes a linear armature comprising: a plurality of coil assemblies, a base plate, and the coil assemblies being next to each other upon the base plate in a non-overlapping and non-interleaving arrangement.

The present invention also includes an embodiment of an armature sub-assembly for mounting upon a back plate in a linear armature comprising: at least one coil assembly, a base plate having the at least one coil assembly fastened thereto, and means for affixing the base plate to the back plate of the linear armature.

Additionally, an embodiment of the present invention included a coil assembly for use in linear motors comprising: a coil composed of windings of a conductor, a center tooth member, the windings being tightly wound on the center tooth member so as to minimize air spaces between the windings, adjacent windings, and the center tooth member, at least one outside tooth member on an outer side of the coil and parallel with the center tooth, and means for insulating the windings from each other and from the center and outside tooth members.

Furthermore, the present invention encompasses a linear magnet assembly for use in a linear motor comprising: magnets having a pair of flat surfaces, a back plate, the magnets having one of the pair of flat surfaces mounted upon the back plate, the magnets being in a row along a first axis with alternating polarities in a direction normal to the pair of flat surfaces, and the magnets having outline shapes such that a generally sinusoidal flux distribution is created along the row thereby reducing cogging effects in the linear motor.

Finally, the present invention also includes a coil assembly comprising: concentric coils, teeth inside a center of and interposed between the concentric coils, and the teeth having lengths increasing as distances from the teeth to the center of the concentric coils increase such that voids between the teeth and the concentric coils are minimized so as to facilitate heat transfer.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
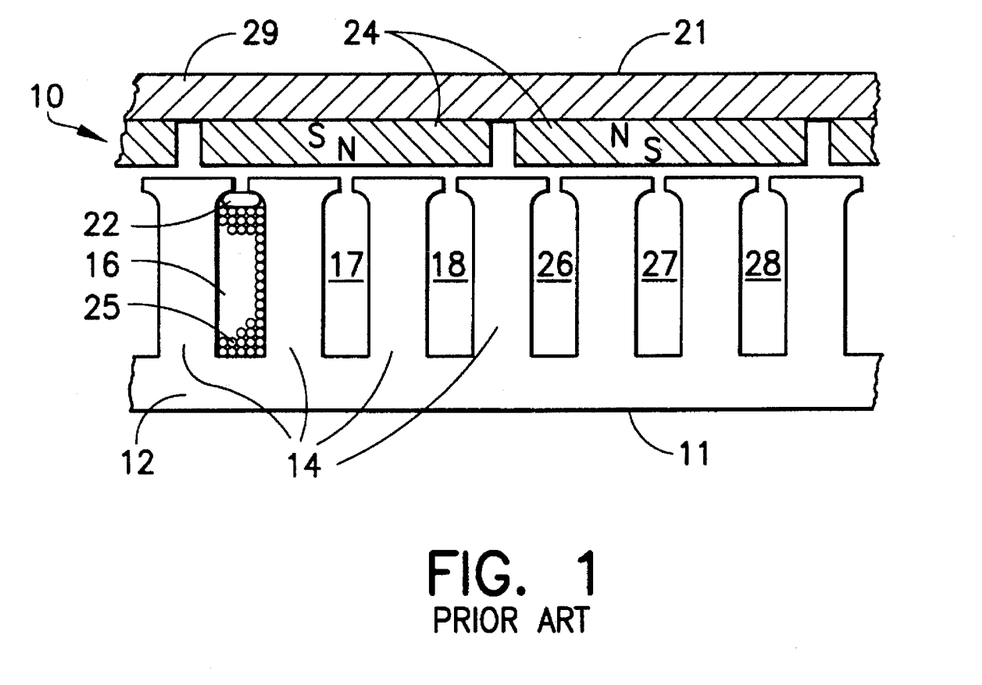
FIG. 1 is a side view of conventional three phase linear motor of the prior art having a sectional view of a coil.

Referring to FIG. 1, there is shown, generally at 10, a side view of a conventional three phase linear motor 10 of the prior art having an armature 11 with a base plate 12 contiguous with the teeth 14. Slot one 16, slot two 17, and slot three 18 are found between teeth 14. A partial sectional view of windings 25 is shown in slot one 16. The windings 25 are held in place by a retaining strip 22. Generally, round wire is used for the windings 25 resulting open spaces being formed between individual turns of the windings 25 and between the windings 25 and the teeth 14. These open spaces increase the thermal resistance between the turns and the base plate thereby reducing the heat dissipation capacity of the windings.

In a three phase linear motor, sinusoidal signals drive coils and have a phase relationship of 0°, 120°, and 240°. In a conventional arrangement, slot one 16 holds windings 25 driven by a first phase, slot two 17 holds windings (not shown) driven by a second phase, and slot three 18 holds windings (not shown) driven by a third phase. The return windings (not shown) from the windings of slots one 16, two 17, and three 18 are carried in the respective slots 26, 27, and 28 to complete the coils for each phase. Thus, every six slots encompass coils for each of the three phases. In such an arrangement, the center of the coils for each phase are spaced apart by a distance equal to the center to center distance of two adjacent teeth 14. A one tooth shift of a movable portion of the linear motor may be effectuated by the excitation of a coil of a phase other than the one previously excited.

Magnet assembly 21 comprises permanent magnets 24 attached to a back iron plate 29. Each magnet has a pole orientation opposite that of the neighboring magnet. The magnets 24 have lengths sufficient to cover three slots 16, 17, and 18, carrying windings driven by each of the three phases. The magnets 24 have centers spaced apart a distance equal to the spacing between every third slot.

Figure 2:
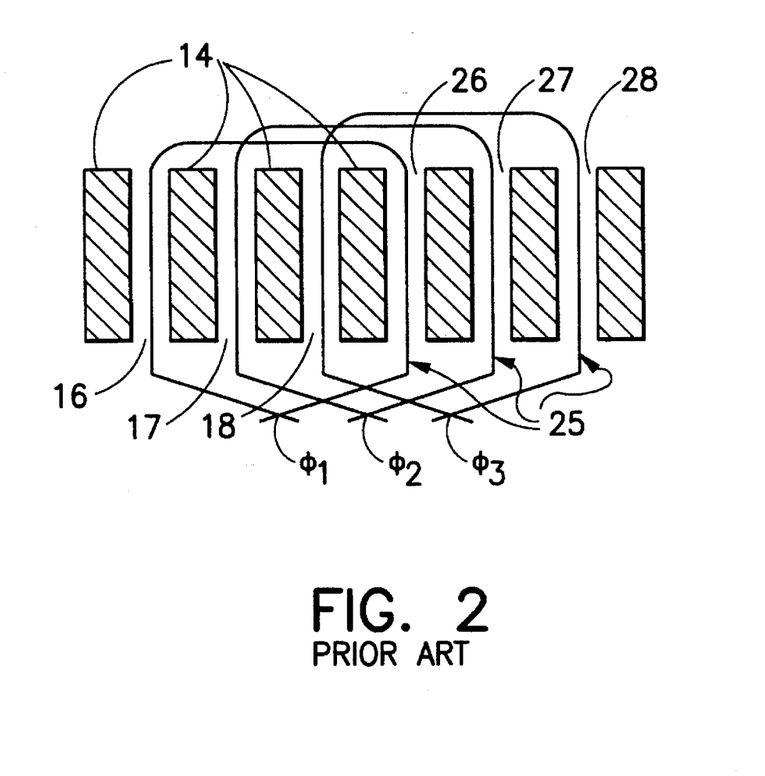
FIG. 2 is a simplified top view of the conventional three phase linear motor depicted in FIG. 1 without a back plate or magnets and showing a coil arrangement thereof.

Referring to FIG. 2, a simplified top view of the conventional three phase linear motor is shown with the back iron plate 29 and magnets 24 removed. The windings 25 are depicted as forming coils having a single turn, however, in practice hundreds or thousands of turns may be employed. It can be seen that the windings 25 for each phase, $\Phi_1$, $\Phi_2$, and $\Phi_3$ overlap at areas outside of the teeth 14. This overlapping of windings 25 results in a bulky arrangement outside of the teeth and presents problems in space restricted applications due to a large width of the assembly.

Furthermore, since the windings 25 must be bundled and shifted to allow for a cross-over of the other two phases, they necessarily protrude further out from the sides of the teeth, thus increasing the thermal path length and thermal resistance thereof to the base plate 12 (see FIG. 1). This reduces the power handling capacity of the linear motor because heat generated by $I^2R$ losses in the windings 25 must be dissipated.

Figure 3:
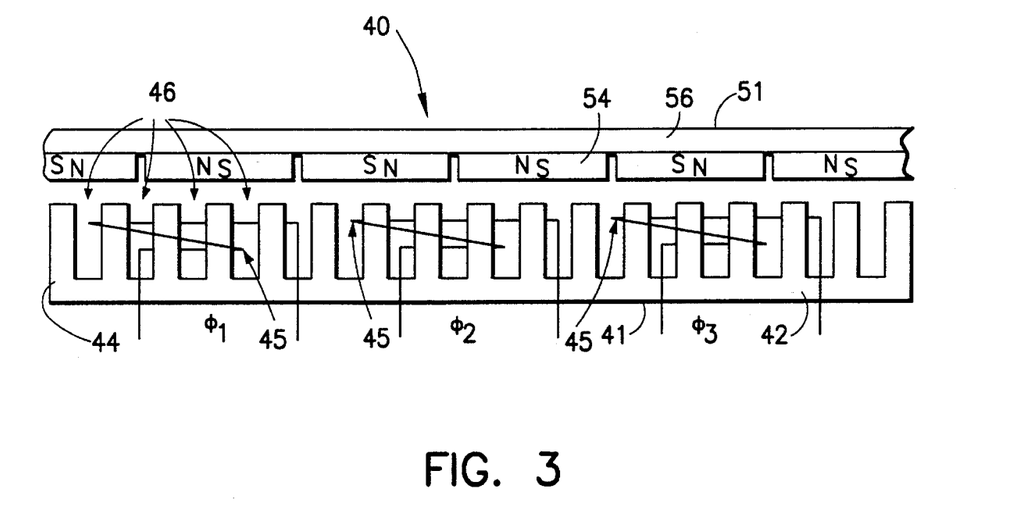
FIG. 3 is a simplified side view of a three phase linear motor of the present invention showing a coil arrangement thereof.

Referring to FIG. 3, a simplified side view of an embodiment of a linear motor 40 of the present invention is shown. The body of the armature 41 is composed of a base plate 42 contiguous with teeth 44. Windings 45 are wound in slots 46 such that the windings 45 for phases $\Phi_1$, $\Phi_2$, and $\Phi_3$, do not overlap outside of the teeth 44. The simplified figure shows one turn of wire in each pair of slots 46 comprising a coil, however, in practice hundreds or more turns are used in each coil. Since the windings 45 for each phase do not overlap outside the ends of the teeth 46, the windings 45 for each phase are wound compactly around the ends of the teeth 46. The width of the armature 41 is thus reduced from that of the prior art.

Figure 4:
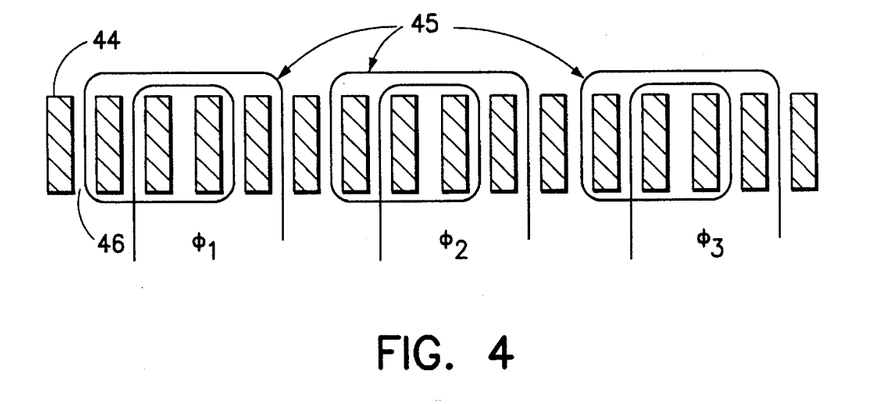
FIG. 4 is a simplified top view of the three phase linear motor of FIG. 3 showing the coil arrangement thereof.

Referring to FIG. 4, a simplified top view of the armature of the linear motor depicted in FIG. 3 is shown. It can be seen that the windings 45 for each phase do not overlap. Additionally, the windings 45 may be compactly layered over the ends of the teeth 44 although the windings 45 for each phase may encompass multiple teeth 44. Thus, since the thermal path length from the portion of the windings 45 passing around the ends of the teeth 45 to the base plate 42 is shorter than that of the prior art, the thermal resistance is decreased and the heat dissipation capacity is increased thereby increasing the power handling capability of the linear motor 40.

Referring back to FIG. 3, magnet assembly 51 comprises magnets 54 affixed to back iron plate 56 such that each successive magnet 54 is oriented so that its polarity opposes the prior magnet. The magnets 54 have center to center spacings equivalent to the center to center spacing of four teeth 44, the spacing being a distance from the center of the first to the center of the fourth tooth. The width of the windings 45 is equivalent to the center to center spacing of five teeth 44. Thus, the excitation of each successive phase may shift the magnet assembly a distance equivalent to the center to center distance of two teeth 44.

It would be apparent to one skilled in the art that the number of teeth 44 encompassed by a coil may be increased or decreased, from that described above, with an appropriate adjustment of the width and spacing of the magnets 54. In a similar manner, the number of coils associated with a set of windings 45 for a given phase may be increased or decreased.

In the present invention the windings 45 may be composed of turns of square wire, preferably copper, so that open spaces are not formed between the windings 45. Alternatively, a foil conductor may be used to create windings 45 without open spaces. It would be apparent to one skilled in the art that such windings 45 would be systematically arranged in the slots 46 and may have other geometric shapes permitting a spaceless distribution.

Figure 5:
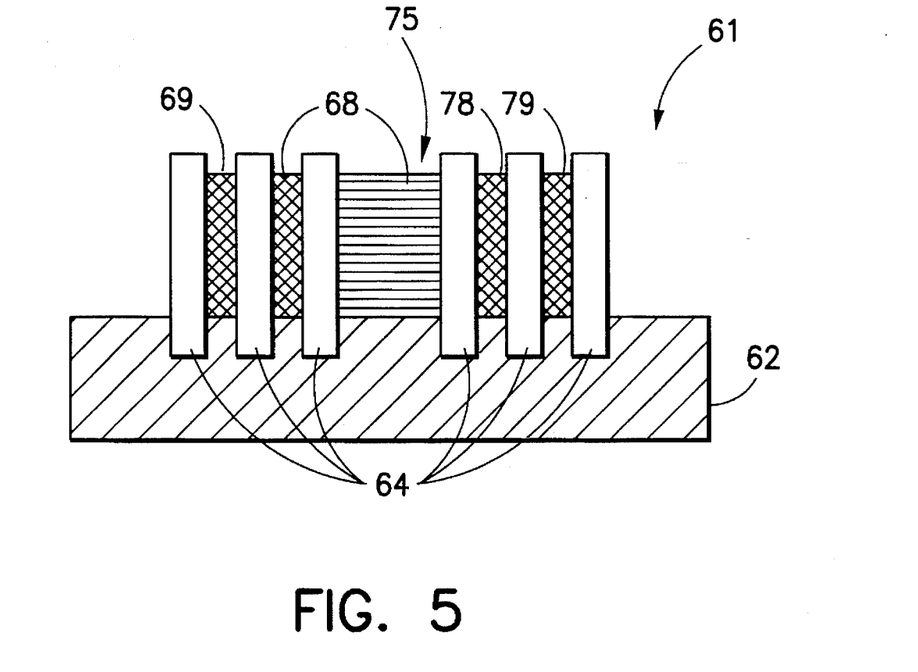
FIG. 5 is a sectional side view of a coil assembly of a second embodiment of the present invention.

Referring to FIG. 5, a coil assembly 61 of a second embodiment of the present invention is shown which is identical to that of the prior embodiment except as described herein. This second embodiment has a base plate 62 and teeth 64 affixed thereto. In such an embodiment the teeth 64 may be composed of a first material having a high magnetic permeability and saturation level while the base plate may be composed of a lower cost second magnetizing material of a suitable magnetic permeability and saturation level.

Generally, materials having the superior magnetic properties are expensive. Silicon steel alloys are often employed due to their desirable magnetic characteristics. In particular, silicon steel alloy M19 is used in the present invention. Additionally, special alloys having still further enhance characteristics, such as HYPERCO ALLOY 50A manufactured by Carpenter Technology Corp., Carpenter Steel Division, may be used in conjunction with silicon steel alloys. These special alloys have still higher costs. Hence, cost savings may be achieved by using such materials only where their superior magnetic properties are essential.

In present application, the teeth 64 must pass the highest concentrations of magnetic flux, and thus, make the best use of the properties of the first material. In the present invention HYPERCO ALLOY 50A is used as the first material, however, the invention is not limited to its use, and those skilled in the art would recognize other suitable substitutes. The flux concentration in the base plate 62 is of a lesser density so that the less expensive second material may be used without compromising performance. Silicon steel alloy M19 is used as an example of a second material and not as a limitation thereof. Furthermore, it is recognized that laminates of these materials may be employed. Therefore, cost savings are achieved by the selective use of materials.

A first coil 68, shown in a cut-away fashion, is wound around the two center most teeth 64 and has a return section 78. A second coil 69, having windings continuous and in series with those of the first coil 68, has a return portion 79 and is wound about teeth encompassing the first coil 68. An empty space 75 exists between the two inner most teeth is a space 75.

The empty space 75 provides for cooling, field distribution control, and mounting methods. The space 75 facilitates heat dissipation to the air therein or facilitates the circulation of a cooling fluid to further aid in heat dissipation. Thus, the thermal characteristic of this embodiment are enhanced. The empty space also allows for the shaping of the field distribution produced by the coil. Since flux density is greater in the higher permeability first material, the size of the space 75 between the two inner teeth may be used to adjust the overall flux distribution of the coil assembly 61. Finally, a hole (not shown) may be provided in the base plate 62 utilizing the space 75 as an access aperture for the installation of a fastener, through the hole, to affix the coil assembly 61 into an armature of a linear motor.

The teeth 64 fit into grooves in the base plate 62 as shown in FIG. 5. An epoxy may then be used to secure the teeth 64 into the groves of the base plate 62. Generally, there should be a close fit between the teeth 64 and the grooves so as to minimize the introduction of magnetic reluctance into the flux path of the coils 68, 69 and to maximize the thermal conductance of the path. An epoxy or other adhesive may be used to fill gaps so as to maintain maximum thermal conductance. Such an epoxy may contain ferrites or other materials with desirable magnetic properties so as to minimize reluctance.

Coil assembly 61 is driven by a single phase, however, an alternate design has a single base plate would carry a multi-phase group of coils, each coil being driven by a respective phase of a given system. A completed armature would then be composed of a back plate having the appropriated number coil group assemblies fastened thereto. In such arrangements the advantage of non-overlapping coils is apparent. Similarly, one skilled in the art would recognize various methods for affixing the teeth 64 into the grooves of the base including epoxies and other adhesives, dovetail configurations with means for locking, pins, and other mechanical fastening means.

Figure 6:
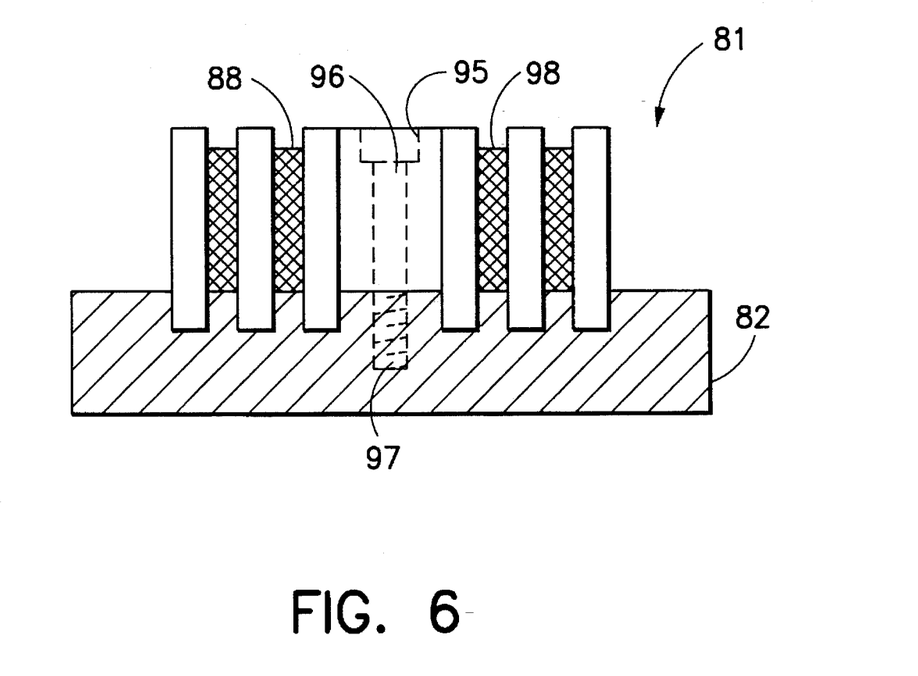
FIG. 6 is a sectional side view of a coil assembly of a third embodiment of the present invention.

Referring to FIG. 6, a coil assembly 81 of a third embodiment of the current invention is shown. The coil assembly 81 is identical to those of the above embodiments except as described herein. The base plate 82 has affixed upon it a first coil shown in cut-away fashion comprising a feed portion 88 and a return portion 98. The first coil is wound upon a center tooth 95 which takes the place of the two inner most teeth of the prior embodiments. The center tooth 95 has a through hole in it aligned with a threaded hole 97 in the base plate 82 so that a threaded fastener (not shown) may be used to affix the center tooth 95, and the coils wound thereupon, to the base plate 82.

To one skilled in the art it would be apparent that various fastening means may be employed to attach the coils to the base plate 82 including nuts and bolts or threaded studs, rivets, and other fastening means.

A solid construction of the center tooth 95 provides a low thermal resistance path from coil portions 88 and 98 to the base plate. This facilitates cooling of the coil and thereby increases the power handling capacity thereof. Furthermore, the use of a removable fastener permits ease of replacement of the coil assembly should it fail.

In FIGS. 5 and 6, coil assembly embodiments 61 and 81 are shown having teeth 64 on outer sides of coil 69 and its return portion 79 in the coil assembly embodiment 61 and the corresponding coil in coil assembly embodiment 81. The coil assemblies are thus complete unto themselves. However, since the coil assemblies are to be fastened in rows abutting each other, one of the outside teeth may be eliminated because the outside tooth of the abutting coil assembly will serve in its place. This eliminates the redundancy of having two teeth abut each other, maximizing the efficient use of the higher cost first material and minimizing the weight of the completed armature assembly.

Various configurations of armatures employing the above described coil assemblies 61 and 81 are realized. In one configuration, each single phase coil assembly 61, 81, is installed into an armature individually. Alternatively, coil assemblies are installed into multi-phase group assemblies having a single base plate which serve as armature subassemblies. These assemblies are then installed into an armature assembly. Another configuration has the armature assembly composed of a single base plate running its entire length with individual coil assemblies affixed thereto. It can be seen that the individualized nature of the coil assemblies permits flexibility in design, production, and stocking. The coil assemblies may be produced and stock for later use in various armature configurations. The overlapping coil assemblies of the prior art required that the entire armature be produced as a single unit, thereby reducing production flexibility.

Referring to FIGS. 7a–7d, the steps in a method of manufacture of an armature of a linear motor of the present invention are illustrated. The first step includes clamping a center tooth 95 in a fixture. The second step, depicted in FIG. 7a, applying a sheet of Kapton insulator 102 over the sides of the center tooth 95, and winding a square or rectangular conductor around the center tooth 95 while under tension creating windings 101. The tension upon the windings 101, and the compact arrangement of the square or rectangular conductor, ensures that spaces left in the construction will be minimized.

Figure 7A:
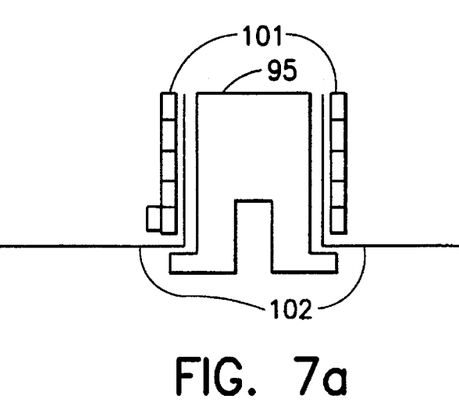
FIG. 7a is a sectional side view of a fourth embodiment of the present invention during a second step of manufacture.

The Kapton insulator 102 serves as a heat resistant insulator to guard against the windings 101 shorting against the center tooth 95 and adjacent teeth (not shown). A sheet of foil conductor, preferably copper, having a width equal to a width of a layer of windings as depicted may be used instead of the square or rectangular conductor.

It be clear to one skilled in the art that the foil and the square or rectangular conductors must have insulation thereon to prevent short circuits. If foil is used, insulation may also be implemented by winding a sheet of Kapton between the windings of foil. It would similarly be clear that other insulators, besides Kapton, may be substituted provided that they have thermal and electrical properties sufficient for the application. Insulation other than that sheathing the conductor may be eliminated depending upon the characteristics of the insulator of the conductor.

Figure 7B:
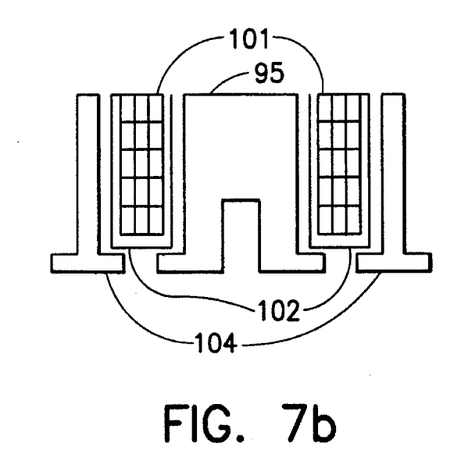
FIG. 7b is a sectional side view of the fourth embodiment of the present invention following a third step of manufacture.

Referring to FIG. 7b, the third step of the method provides for folding the Kapton insulator 102 over a first coil formed of windings 101 and applying teeth 104 to sides of the first coil. Completing this step calls for clamping teeth 104, with the first coil therebetween, in the same manner as the center tooth 95 had been clamped in the first step. A retaining stick (not shown) may be placed and clamped between the teeth 104 and the center tooth 102 at a base of the coil so as to prevent windings 101 from escaping from between the teeth 104 and the center tooth 95.

Figure 7C:
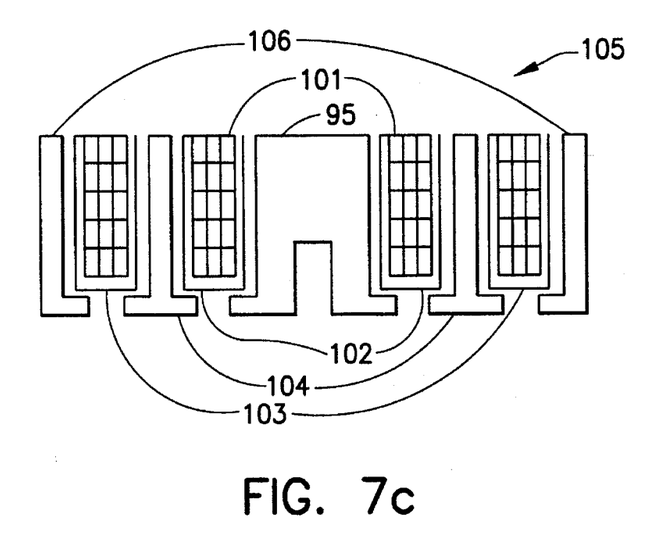
FIG. 7c is a sectional side view of a completed coil assembly of the fourth embodiment of the present invention following a fourth step of manufacture.

Referring to FIG. 7c, a coil assembly 105 is shown after the completion of the fourth step which includes continuing the winding of the conductor around the teeth applied in the second step, repeating steps one through three upon the present assembly until the requisite number of coils have been created.

Figures 7D, 8:
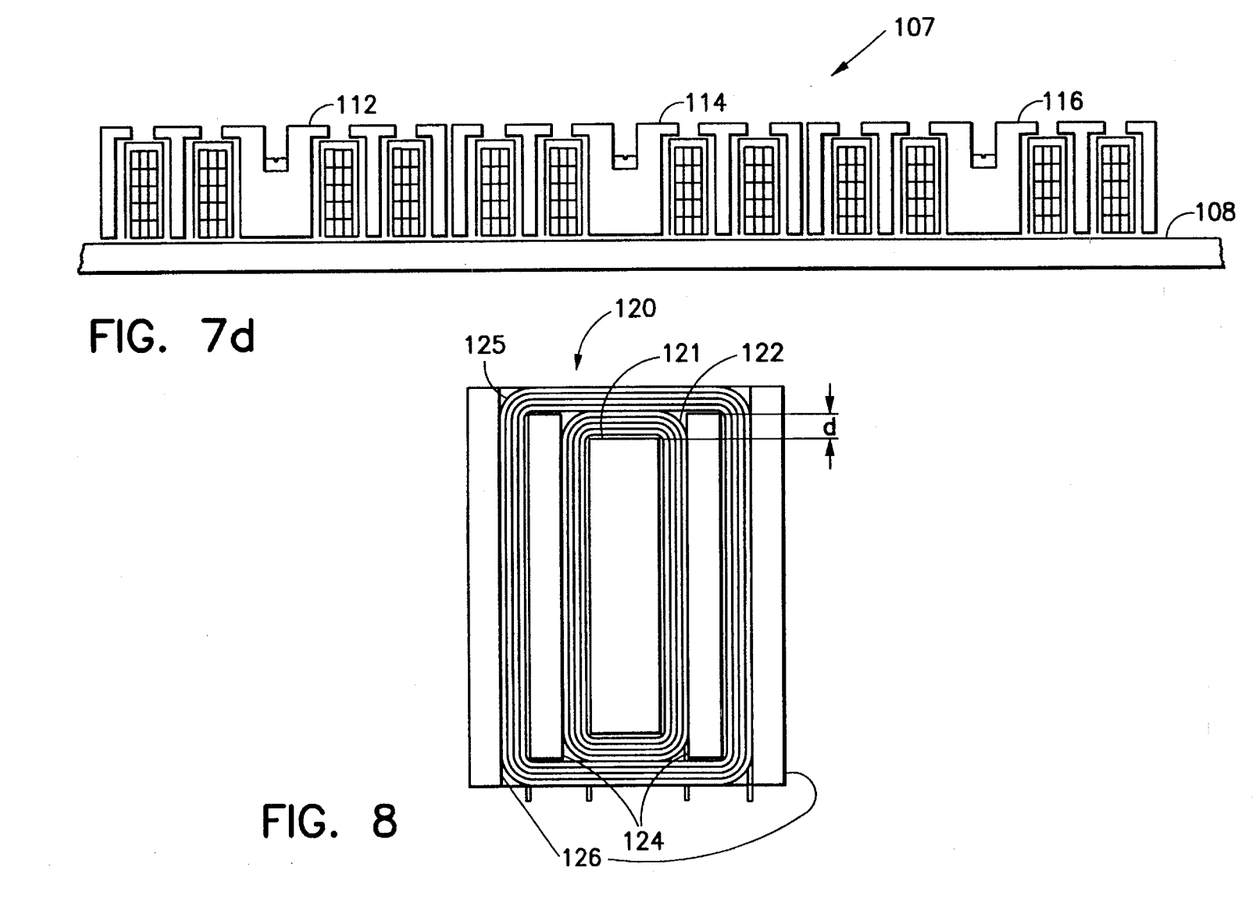
FIG. 7d is a sectional side view of a completed armature assembly of the fourth embodiment of the present invention following steps 5 through 7 of manufacture.
FIG. 8 is a top view of an embodiment of a coil assembly of the present invention including offset teeth.
Figure 9A:
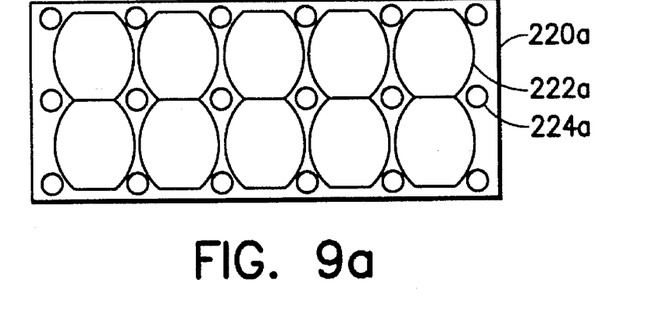
FIG. 9a is a bottom view of an embodiment a magnet assembly of the present invention having magnets of a generally ellipsoidal shape.
Figure 9B:
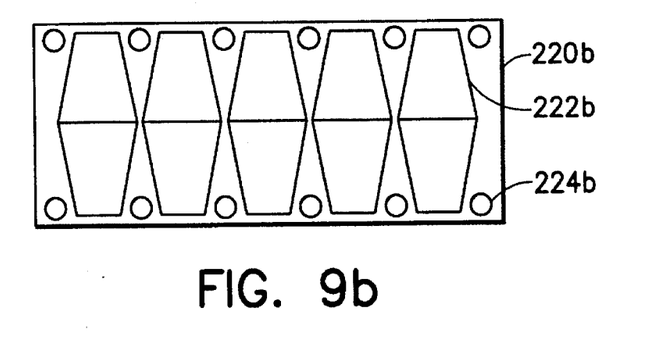
FIG. 9b is a bottom view of a second embodiment of a magnet assembly of the present invention having magnets of a substantially trapezoidal shape.
Figure 9C:
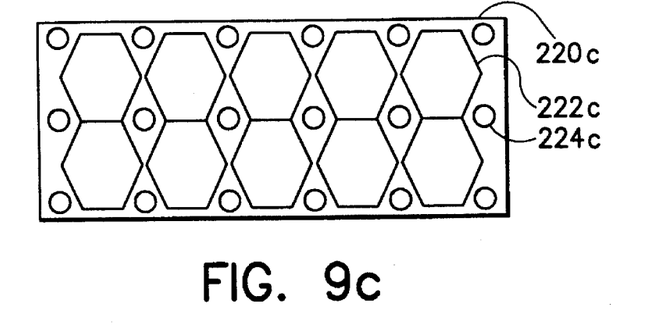
FIG. 9c is a bottom view of a third embodiment of a magnet assembly of the present invention having magnets of a substantially hexagonal shape.
Figure 9D:
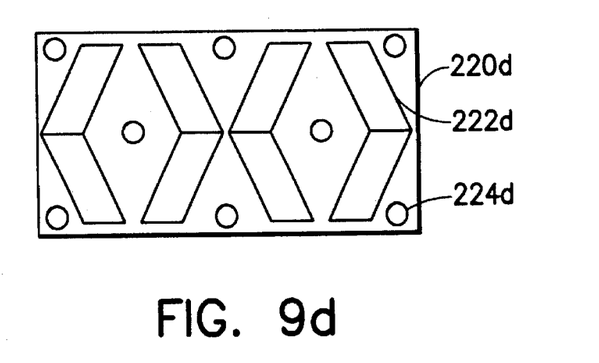
FIG. 9d is a bottom view of a fourth embodiment of a magnet assembly of the present invention having magnets of a parallelogram shape.

Referring to FIG. 7d an armature assembly 107 is shown following the completion of steps 5 through 7. Step 5 calls for completing the requisite number of coil assemblies by repeating steps 1 through 4. Step 6 calls for coating a base plate 108 with an epoxy. Step 7 includes positioning first, second, and third coil assemblies 112, 114, and 116 upon the base plate 108 and fastening the coil assemblies 112, 114, 116, to the base plate 108 with threaded fasteners passing through a through hole in the center tooth 95.

It would be clear to one skilled in the art that the coil assemblies 112, 114, and 116, may be attached to the base plate 108 by coating the base plate 108 with a suitable epoxy and clamping the coils assemblies 112, 114, and 116 in place until the epoxy cures. Furthermore, one skilled in the are would realize that, depending upon the surface variations of the coil assemblies 112, 114, 116 and the base plate 108, and the threaded fastening means, the step of coating the base plate 108 with epoxy may be replaced by coating the base plate with a thermally conductive medium, such as a thermal grease, and then fastening the coil assemblies 112, 114, 116 with the threaded fasteners.

Referring to FIG. 8, another embodiment of the present invention is shown which includes the use of offset teeth which further eliminate open spaces within the coil assembly. Coil assembly 120 has a center tooth 121 around which is situated a first coil 122. Located on both sides of first coil 122 is a first set of teeth 124 which have a length greater than that of the center tooth 121 by a distance 2d where d is the distance which the first set of teeth 124 extend past the center tooth 121 on either side. The distance d is related to a thickness of coil 121 such that ends of the first set of teeth 124 are generally even with an end surface of first coil 122. Second coil 125 encircles the first set of teeth 124 and first coil 122, remaining in close proximity or contact therewith so as to maximize heat transfer through the teeth 124 and the magnetic flux transfer through the teeth 124. Conventional coil assemblies have teeth of uniform length which results in coils with voids between themselves and ends of the teeth where the coils are extended to overlap other coils. The present invention produces a coil assembly with superior thermal and magnetic characteristics because the voids are reduced or eliminated by the offset teeth having varying lengths. Thus, the second coil 125 encloses a volume comprised of teeth 121 and 124 and first coil 122 wherein voids have been substantially eliminated.

A second set of outside teeth 126 are adjacent to sides of the second coil 125 and have ends that extend to a point generally even with ends of the second coil 125. The second set of outside teeth 126 serves to further facilitate heat transfer and flux distribution by extending further than the first set of outside teeth 124 thereby maintaining close proximity or contact with a greater amount of surface area of the second coil 125 than it would had it been of the same length as the first set of teeth 124.

Referring to FIGS. 9a–9d, magnets 222a–d having various shapes are shown mounted upon back iron plates 220a–d in magnet assemblies. The magnets 222a–d are of uniform thickness so that their surfaces are a constant distance above surfaces of coil assemblies (not shown) of an armature assembly (not shown). The shapes of the magnets 222a–d, in a plane of FIGS. 9a–d, are designed so as to produce, along an axis of movement, a generally sinusoidal flux distribution for interaction with fields produced by the coil assemblies. The various magnet shapes 222a–d depicted have a width which is generally greater in the center than at the abutting sides, the differing configurations having varying transitional characteristics. This sinusoidal flux distribution reduces cogging effects produced when the coil assemblies interact with abruptly alternating magnetic fields produced by adjacent rectangular magnets aligned normal to the axis of movement.

Varying the shape of the magnets 222a–d in the plane of the back plate allows for ease of production. The magnets 222a–d may be manufactured from sheet material; the shapes being cut from the sheet material so as to minimize waste. Furthermore, depending upon the nature of the magnetic material used, the magnets may be produced by cost effective stamping operations. Magnets varying in height rather than shape require more expensive machining operations.

The non-rectangular shaping of the magnets 222a–d produces spaces therebetween when the magnets 222a–d are mounted on back iron plates 220a–d. Mounting holes 224a–d are located in the back iron plates 220a–d in the spaces between the magnets 222a–d. This eliminates the need to use protruding ears with holes for mounting the back iron plates 220a–d and thus reduces the footprint and weight of the back iron plates 220a–d.

Furthermore, less magnetic material is used in a configuration having shaped magnets because the magnets 222a–d need not extend further than required to interact with the coil assemblies. Additional weight savings are thus achieve resulting in increased acceleration of the magnet assemblies. Weight savings of 10% may be achieved with a commensurate increase in acceleration.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A linear motor having an armature comprising:

a plurality of coil assemblies;

a base plate;

said coil assemblies being next to each other upon said base plate in a non-overlapping and non-interleaving arrangement;

said coil assemblies including a coil composed of windings of a conductor;

a plurality of center tooth members;

said windings being tightly wound on the center tooth members so as to minimize air spaces between the windings, adjacent windings, and the center tooth members;

at least one outside tooth member on an outer side of each coil assembly and parallel with said center tooth members; and means for insulating said windings from each other and from said center and outside tooth members.

2. A linear motor having an armature according to claim 1 wherein:

said conductor is one of square copper wire and copper foil.

3. A linear motor having an armature according to claim 1 wherein:

said center tooth members and said outside tooth members are integral with said base plate.

4. A linear motor having an armature according to claim 1 further comprising means for affixing said coil assemblies to said base plate.

5. A linear motor having an armature according to claim 4 wherein said means for affixing includes an epoxy for attaching said coil assemblies to said base plate.

6. A linear motor having an armature according to claim 4 wherein said means for affixing includes a tongue and groove means for interlocking said coil assemblies with said base plate.

7. A linear motor having an armature according to claim 6 wherein said tongue and groove means includes:

protruding teeth of said center tooth members and said outside tooth members protruding past said windings and out of bases of said coil assemblies;

grooves in said baseplate; and said protruding teeth interlocking with said grooves so as to affix said coil assembly to said base plate.

8. A linear motor having an armature according to claim 6 wherein each coil assembly includes only one center tooth member and said tongue and groove means includes said center tooth member having an opening in its center for one of cooling purposes and clearance purposes for means for mounting said base plate.

9. A linear motor having a armature according to claim 4 wherein said means for affixing includes:

said center tooth members having a through aperture; and threaded means for affixing passing through said through aperture so as to engage said coil assemblies with said base plate.

10. A linear motor having an armature according to claim 4 wherein:

said center tooth members and said outside tooth members are composed of a first magnetizing material; and said base plate is composed of a second magnetizing material.

11. A coil assembly for use in linear motors comprising:

a coil composed of windings of a conductor;

a plurality of center tooth members;

said windings being tightly wound on the center tooth members so as to minimize air spaces between the windings, adjacent windings, and the center tooth members;

at least one outside tooth member on an outer side of said coil and parallel with said center tooth members; and means for insulating said windings from each other and from said center and outside tooth members.

12. A coil assembly according to claim 11 wherein:

said conductor is one of square copper wire and copper foil.

13. A coil assembly according to claim 11 further comprising means for mounting said coil assemblies.

14. A coil assembly according to claim 13 wherein said means for mounting includes protruding teeth of said center tooth members and said outside tooth members protruding past said windings and out of bases of said coil assemblies.

15. A coil assembly according to claim 13 wherein each center tooth member has an opening in its center for one of cooling purposes and clearance purposes for said means for mounting.

16. A linear armature according to claim 13 wherein said means for mounting includes said center tooth members having a through aperture for a fastening means.

17. A coil assembly comprising:

concentric coils;

teeth inside a center of and interposed between the concentric coils;

the teeth being spaced apart along a first direction;

the concentric coils being substantially in the first direction and in a second direction perpendicular to the first direction;

the teeth having lengths increasing in the second direction as distances in the first direction from the teeth to the center of the concentric coils increase such that voids between the teeth and the concentric coils are minimized so as to facilitate heat transfer.

18. A coil assembly according to claim 17 wherein:

said teeth include a center tooth and a first set of teeth;

said concentric coils include a first coil and a second coil;

the first coil encircles the center tooth;

the first set of outside teeth has a length in the second direction greater than that of the center tooth and has end surfaces substantially even with end surfaces of the first coil;

the second coil encircles the first set of outside teeth and the first coil; and the second coil encloses a volume composed of the first set of outside teeth, the first coil, and the center tooth wherein voids are substantially eliminated so as to maximize heat transfer therethrough.

* * * * *